United States Patent
Dolezilek et al.

(10) Patent No.: US 11,831,529 B2
(45) Date of Patent: Nov. 28, 2023

(54) REDUNDANT GENERIC OBJECT ORIENTED SUBSTATION EVENT (GOOSE) MESSAGES

(71) Applicant: Schweitzer Engineering Laboratories, Inc., Pullman, WA (US)

(72) Inventors: David J. Dolezilek, Pullman, WA (US); Ricardo L. Abboud, Pullman, WA (US); Amandeep Singh Kalra, Mill Creek, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 9 days.

(21) Appl. No.: 17/592,736

(22) Filed: Feb. 4, 2022

(65) Prior Publication Data
US 2023/0254228 A1    Aug. 10, 2023

(51) Int. Cl.
*H04L 43/0823* (2022.01)
*H04L 43/50* (2022.01)
*H04L 43/08* (2022.01)

(52) U.S. Cl.
CPC .......... *H04L 43/0847* (2013.01); *H04L 43/08* (2013.01); *H04L 43/50* (2013.01);
(Continued)

(58) Field of Classification Search
CPC .......... Y04S 10/16; Y04S 10/18; Y04S 10/20; Y04S 10/30; Y04S 10/52; H04L 43/08; H04L 43/0847; H04L 43/50
See application file for complete search history.

(56) References Cited

U.S. PATENT DOCUMENTS

| 5,191,520 A | 3/1993 | Eckersley |
| 6,694,271 B1 | 2/2004 | Hannon |

(Continued)

FOREIGN PATENT DOCUMENTS

| CA | 2604080 | 7/2007 |
| CN | 100401647 | 7/2008 |

(Continued)

OTHER PUBLICATIONS

E. Atienza, "Testing and troubleshooting IEC 61850 GOOSE-based control and protection schemes," 2010 63rd Annual Conference for Protective Relay Engineers, College Station, TX, USA, 2010, pp. 1-7, doi: 10.1109/CPRE.2010.5469485. (Year: 2010).*

(Continued)

*Primary Examiner* — Glenton B Burgess
*Assistant Examiner* — Rachel J Hackenberg
(74) *Attorney, Agent, or Firm* — Bradley W. Schield; Richard M. Edge

(57) ABSTRACT

Systems and methods to send or receive redundant Generic Object Oriented Substation Event (GOOSE) messages are described. An intelligent electronic device may obtain power system data from a power system. The IED may publish the power system data in a first GOOSE message and publish the same power system data in a second GOOSE message. The second GOOSE message may have different header information than the first GOOSE message to allow the subscriber to determine that the redundant GOOSE messages are both received. If the first and second GOOSE message are duplicates with identical header information but unique trailer information methods allow the subscriber to determine that the duplicate GOOSE messages are both received.

14 Claims, 9 Drawing Sheets

(52) U.S. Cl.
CPC ............... *Y04S 10/16* (2013.01); *Y04S 10/18* (2013.01); *Y04S 10/20* (2013.01); *Y04S 10/30* (2013.01); *Y04S 10/52* (2013.01)

(56) References Cited

U.S. PATENT DOCUMENTS

| | | | |
|---|---|---|---|
| 7,373,222 B1 | 5/2008 | Wright | |
| 7,729,276 B2 | 6/2010 | Akyol | |
| 9,270,109 B2* | 2/2016 | Dolezilek | ................ H04L 1/08 |
| 9,450,407 B2 | 9/2016 | Kulathu | |
| 9,620,955 B2 | 4/2017 | Dolezilek | |
| 10,012,681 B2 | 7/2018 | Wimmer | |
| 10,205,647 B2 | 2/2019 | Yang | |
| 10,379,991 B2 | 8/2019 | Yang | |
| 10,782,328 B2 | 9/2020 | Abubakari | |
| 10,859,611 B2 | 12/2020 | Yang | |
| 11,550,285 B1 | 1/2023 | Shrestha | |
| 2002/0173927 A1* | 11/2002 | Vandiver | ............ G01R 31/3272 702/122 |
| 2003/0005375 A1 | 1/2003 | Kretch | |
| 2008/0127210 A1 | 5/2008 | Bosold | |
| 2008/0183406 A1 | 7/2008 | Lee | |
| 2009/0300165 A1* | 12/2009 | Tuckey | ............. G05B 23/0264 709/224 |
| 2011/0047264 A1* | 2/2011 | Hilpert | ................... H04L 69/02 709/224 |
| 2011/0069709 A1* | 3/2011 | Morris | ................ H04L 47/6275 370/394 |
| 2014/0104738 A1 | 4/2014 | Schweitzer | |
| 2014/0280713 A1 | 9/2014 | Gammel | |
| 2014/0280714 A1 | 9/2014 | Achanta | |
| 2014/0293494 A1* | 10/2014 | Allen | ............... H02J 13/00034 361/93.1 |
| 2015/0002186 A1 | 1/2015 | Taft | |
| 2016/0156184 A1* | 6/2016 | Sharma | .............. G05B 23/0224 700/286 |
| 2019/0116183 A1 | 4/2019 | Hussain | |
| 2019/0173860 A1 | 6/2019 | Sankaran | |
| 2019/0342101 A1 | 11/2019 | Hayes | |
| 2020/0106719 A1 | 4/2020 | Acharya | |

FOREIGN PATENT DOCUMENTS

| | | | | |
|---|---|---|---|---|
| CN | 103856372 | * | 11/2014 | ............. H04L 12/26 |
| KR | 101680800 B1 | * | 11/2016 | |

OTHER PUBLICATIONS

I. Ali and M. S. Thomas, "GOOSE based protection scheme implementation & testing in laboratory," ISGT 2011, Anaheim, CA, USA, 2011, pp. 1-7, doi: 10.1109/ISGT.2011.5759133. (Year: 2011).*
Vizimax, Analog Merging Unit—AMU, 2019. retrieved from https://www.vizimax.com/products-services/merging-units.
GE Multilin Inc., L90 Line Current Differential System, Instruction Manual for Version 7.6x, Jun. 2017, Section 5.11.1.
Abb, Relion® 670 Series Transformer Protection RET670 Version 2.2 IEC, Application Manual, Mar. 2018, Section 24.12.1.1.
Yang, Qiaoyin; Keckalo, David; Dolezilek, David; Cenzon, Ed: "Testing IEC 61850 Merging Units" 44th Annual Western Protective Relay Conference, Oct. 2017.

* cited by examiner

REDUNDANT GENERIC OBJECT ORIENTED SUBSTATION EVENT (GOOSE) MESSAGES

TECHNICAL FIELD

The present disclosure relates generally to power system messaging and, more particularly, to increased capabilities realized by sending multiple Generic Object Oriented Substation Event (GOOSE) messages between intelligent electronic devices (IEDs) of a power system.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
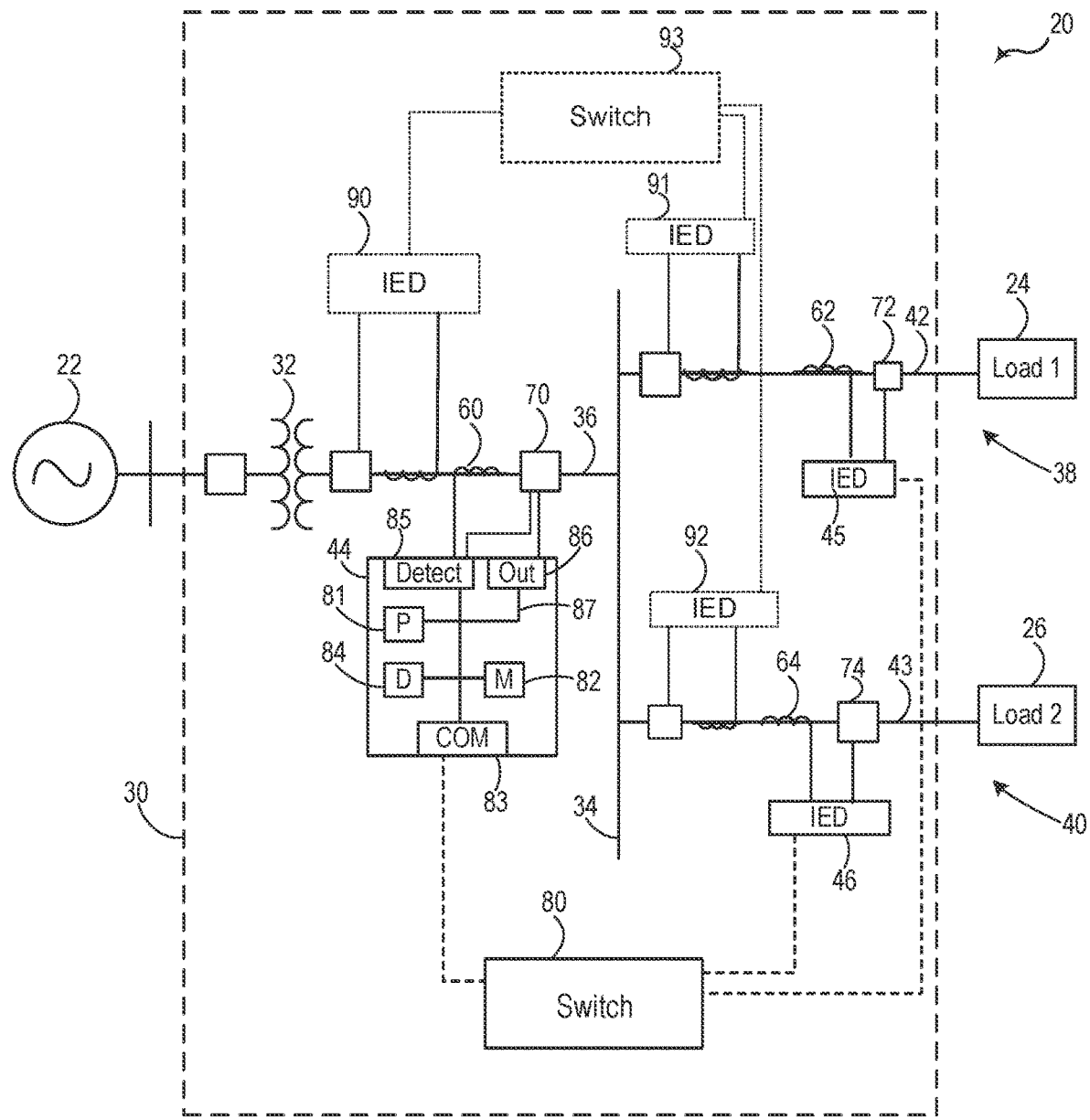
FIG. 1 is a one-line diagram of an electric power delivery system having a communication network with intelligent electronic devices (IEDs) that use redundant Generic Object Oriented Substation Event (GOOSE) messages to improve reliability of the power system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, and transformers, to provide electrical energy from sources to loads. Various intelligent electronic devices (IEDs) may be used in monitoring, control, and protection of the power delivery system IEDs may communicate power system data with other IEDs, such as raw and processed voltage measurements, raw and processed current measurements, protection signals and circuit breaker status, among others. Some IEDs may support Generic Object Oriented Substation Event (GOOSE) messages that follow the International Electrotechnical Commission (IEC) 61850 standard. Such IEDs may communicate GOOSE messages over an Ethernet cable or network.

However, communication issues on the network may cause GOOSE messages to not be received. For example, a network path between two IEDs may be disconnected. The failure to receive messages containing protection signals, measurements, and status may interfere with the communications assisted logic in the receiving IED that relies on those signals. The failure to process message contents, including protection signals, measurements, and status, due to an attribute associated with the message or message contents may interfere with the communications assisted logic in the receiving IED that relies on those signals. Further, tests of communications networks and communications assisted logic may be performed on IEDs in which IEDs send and/or receive test or simulation messages or messages with test contents for testing purposes in receiving IEDs Staging such test messages may cause issues on the power system if a power system event were to occur during the testing and not be addressed by the appropriate protective IED due to the situation of the IED being placed into test mode in order to publish GOOSE message contents with test attributes for use in a second receiving IED in test mode in which the communications assisted logic is being tested. Similarly, staging such test messages may cause issues on the power system if a power system event were to occur during the testing and not be addressed by the appropriate protective IED, a third IED receiving signals from the publishing IED, due to the situation of the publishing IED being placed into test mode in order to publish GOOSE message contents with test attributes for use in a second receiving IED in test mode and the third IED is not in test mode but does not act on the GOOSE message contents from the publishing IED because the message contents are flagged with the test attribute. Further, it may not be practical to test the ability of the network to deliver messages to all subscribers when IEDs are communicating messages flagged as test messages rather than actual messages containing power system event signals or when IEDs are placed into test mode and fail to react to an actual power system event. Additionally, such testing does not provide a way to test interdependent protection logic distributed across IEDs while some or all IEDs remain in service to protect the power system. Accordingly, there is a need for a way to improve the reliability and testing of networks of IEDs that exchange GOOSE messaging.

As explained below, redundant, and not duplicate, GOOSE messages may be used to address network reliability and testing of IEDs. For example, a publishing IED may send a first GOOSE message of authentic power system data via a first network path. The publishing IED may send a second GOOSE message via a second network path in which the second GOOSE message contains the same dataset of power system data. The subscribing IED may receive the first GOOSE message and the second GOOSE message and verify that the GOOSE messages refer to the same dataset and the GOOSE messages have different header information. In another example, both GOOSE redundant messages are published from the source IED into the same network which is configured to deliver them via the same or unique network paths. This process is superior to the method of sending duplicate or replicated messages with the same contents and message header information into two different networks and made unique only by a different message trailer on each network. When two redundant messages are configured to contain the same dataset from the same field contacts connected to the publisher, this method provides depth of information about the message creation and delivery process, provides detail about the health and behavior of the data source, and provides much more information about the source than replicated messages. When two messages are configured to contain unique signals representing power system values from unique field contacts connected to the publisher, this method provides depth of information with detail about the health and behavior of the data source and the field instrumentation. In this case, comparing two values representing the same power system signal but from unique field instrumentation will provide more information about the source than redundant signals. The receiving IED can compare the values to verify correct operation when similar or incorrect when they differ. When the second GOOSE message is expected to be received (due to receiving the first GOOSE message) but not received, the subscribing IED may create and send an alarm indicating that a network path is not communicating, thereby allowing an operator to request a repair to ensure that the communication network is operating properly. Since failure of a protection signal exchange is dangerous and detection of failure of either redundant message is possible, these messages are identified as dangerous detected (DD) failures by "IEC 61508 Functional safety of electrical/electronic/programmable electronic safety related systems" which details the differences between DD failures and dangerous undetected (DU) failures. Devices exchanging duplicate or replicated GOOSE messages with the same contents and message header information made unique only by a different message trailer often use the first message to be received and discard the second. They do not detect or alarm when the second is not received and so this technology cannot be used to detect network failures. This creates an IEC 61508 DU situation with the consequence that no early detection is possible and the first alert is when the protection fails completely when both of the duplicated message paths fail. However, if the receiving device message is capable of expecting a second duplicate message to be received (due to receiving the first GOOSE message) but is not received, the subscribing IED may create and send an alarm indicating that a message path is not communicating. This amounts to redundant error detection of duplicate messages so that a single failed duplicate path is changed from dangerous undetected to dangerous detected.

Further, redundant GOOSE messages may be used to communicate both test messages and live messages into the same or different networks. For example, a publishing IED may send a first GOOSE message that includes simulated power system data test data. The publishing IED may also send a second GOOSE message that includes live authentic power system data. By sending both test data and live power system data, an operator may test the protection system while the communication system is online and the power system is energized without affecting communication of the live power system data. Further, the operator may test the protection logic of the IED or multiple IEDs without affecting the actual power system. Also, in situations such as when no other IED other than the IED producing or consuming test signals, is available to isolate a fault, the IED can be configured to perform a protective trip even when in test mode when it receives authentic data from another IED Further, it is an advantage to have the publishing IED in normal mode and performing normal protection during the time period that it is publishing test values for use by a second IED that is in test mode.

FIG. 1 is a one-line diagram of a power system 20 that includes a power source 22, such as a generator, that generates and provides power to loads 24 and 26, in accordance with an embodiment. The power system 20 may include equipment, such as electrical generators, transformers, power lines (e.g., transmission and distribution lines), circuit breakers, buses, loads, and the like. A variety of other types of equipment may be included in the power system 20, such as voltage regulators and capacitor banks, among others.

As illustrated, the power source 22 may provide power, via a substation 30, to power the loads 24 and 26. The substation 30 includes a transformer 32 that steps up or steps down the voltage to be provided to a bus 34 via power line 36. Various feeders 38 and 40 may be electrically connected to the bus 34 to provide power to the loads 24 and 26 via power lines 42 and 43. Although illustrated in single-line form for purposes of simplicity, power system 20 may be a multi-phase system, such as a three-phase electric power delivery system.

The power system 20 may be monitored by one or more IEDs 44-46, although additional IEDs may also be utilized. As used herein, an IED (such as IEDs 44-46) may refer to any microprocessor-based device that monitors, controls, automates, and/or protects monitored equipment within the power system 20. Such devices may include, for example, remote terminal units, differential relays, transformer relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, remote input and output modules, merging units, intelligent merging units, process interface devices, process interface units and the like. The term IED may be used to describe an individual IED or a system comprising multiple IEDs. The IEDs 44-46 may obtain electric power system data using contact inputs wired to the breaker 70, current transformers (CTs) 60, 62, and 64, potential transformers (PTs), and the like. The IEDs 44-46 may detect events, such as fault events, on the power lines 36, 42, and 43 using current and voltage signals from the CTs 60, 62, and 64 and/or the PTs. The IEDs 44-46 may be directly wired or communicatively coupled to circuit breakers (CBs) 70, 72, and 74 to send control signals to the CBs 70, 72, and 74 to open (i.e., trip) or close the CBs 70, 72, and 74 based on the power system data.

The IED 44 may be embodied as a transformer relay, and IEDs 45 and 46 may be embodied as feeder relays. Each of the IEDs 44-46 may further include one or more processors 81, a computer-readable medium (e.g., memory 82), a communication interface 83, a display terminal 84, detection circuitry 85, and output circuitry communicatively coupled to each other via one or more communication buses 87. The processor 81 may be embodied as a microprocessor, a general-purpose integrated circuit, an application specific integrated circuit (ASIC), a field programmable gate array (FPGA), and/or other programmable logic devices. It should be noted that the processor 81 and other related items in FIG. 1 (e.g., the memory 82) may be generally referred to herein as "processing circuitry." Furthermore, the processing circuitry may be a single contained processing module or may be incorporated wholly or partially within any of the other elements within the IEDs 44-46. It should be noted that FIG. 1 is merely one example of a particular implementation and is intended to illustrate the types of components that may be present in the IEDs 44-46.

In the IEDs 44-46 of FIG. 1, the processor(s) 81 may be operably coupled with the respective memory 82 to perform various algorithms. Such programs or instructions executed by the processor 81 may be stored in any suitable article of manufacture that includes one or more tangible, computer-readable media at least collectively storing the instructions or routines, such as the random-access memory (RAM) and the read-only memory (ROM). The IEDs 44-46 of FIG. 1 may be communicatively coupled to exchange signals for use within the logic of each IED In the illustrated embodiment, the IEDs 44-46 includes detection circuitry 85 that detects various electrical conditions of the power system primary equipment 22, 32, 70 and power lines 36, 42, and 43 based on the input signals. The detection circuitry 85 may include a current conversion circuit (e.g., a transformer) that transform the input signals to levels that may be sampled by the IEDs 44-46. The detection circuitry 85 may include digital status contact inputs which produce digital signals representative of an open and closed circuit and analog-to-digital converter(s) that sample the current and voltage signals and produce digital signals representative of measured current and measured voltage on the power line which may be transmitted to the processor 81. The IEDs 44-46 may compare the current measurements to thresholds to detect faults and to disconnect the bus 34 or feeders 38 and 40 from the power source 22. For example, if current on one or more phases exceeds a preset threshold and/or current-over-time exceeds a preset threshold, the processor 81 may detect a fault event and send a signal, via the output circuitry 86, to open the CB 70. Alternatively, if current on one or more phases exceeds a preset threshold and/or current-over-time exceeds a preset threshold in another IED such as IEDs 45 or 46, and those IEDs detect a fault event and send a signal, via the output circuitry to open the CB 72 or 74, and the CB fails to open they will send a trip signal via output circuitry or digital message to IED 44.

The IEDs 44-46 may include a communication interface 83, such as ethernet port(s), fiber optic port(s), or the like, to communicate with the other IEDs. Further, the IEDs 44-46 may include a display terminal 86 and input structures (e.g., Universal-Serial-Bus (USB) ports, buttons, touchscreens, etc.) to allow operators to review events on the power line, change settings, etc.

The IEDs 44-46 may be connected to a switch 80 to form a wired local area network (LAN) used to communicate GOOSE messages. When using GOOSE messaging, a publishing IED may send (e.g., via multicast) a GOOSE message to the other IEDs. If an IED is a subscriber to the GOOSE message sent, the subscribing IED may obtain the power system data and perform protection operations on the power system data. The switch 80 may receive GOOSE messages of power system data from a sending IED and forward the power system data to a receiving IED For example, IEDs 45 and 46 may send power system data, such as voltage measurements, current measurements, and CB status, among others, to IED 44. If IED 45 were to detect a fault, IED 45 may communicate the fault event to IED 44 and the status of CB 72 via a hardwired connection. If the CB 72 opens and isolates the fault, the IED 44 may keep CB 70 closed to allow power to continue to be delivered to load 26. If IED 45 detects a fault and CB 72 remains closed, IED 44 may respond by opening CB 70, thereby suspending energy flow into both the faulted feeder served by breaker 72 and the non-faulted feeder served by breaker 74. The IED 44 may respond to fault events faster due to the faster speed of sending status via message on the communication network than a hardwired connection, thus improving the reliability of the power system 20. The switch 80 may include message switching hardware and forwarding circuitry, which may include one or more processors, memory, and communication ports that allow the switch 80 to receive and forward power system data to a receiving device.

In some embodiments, the power system 20 may include a dual primary protection system that includes IEDs 90-92 that are connected to a second communication switch 93. The dual primary protection system may perform redundant capabilities of the first protection system (i.e., IEDs 44-46). By providing a second set of protection operations, reliability of the power system may be improved.

Figure 2:
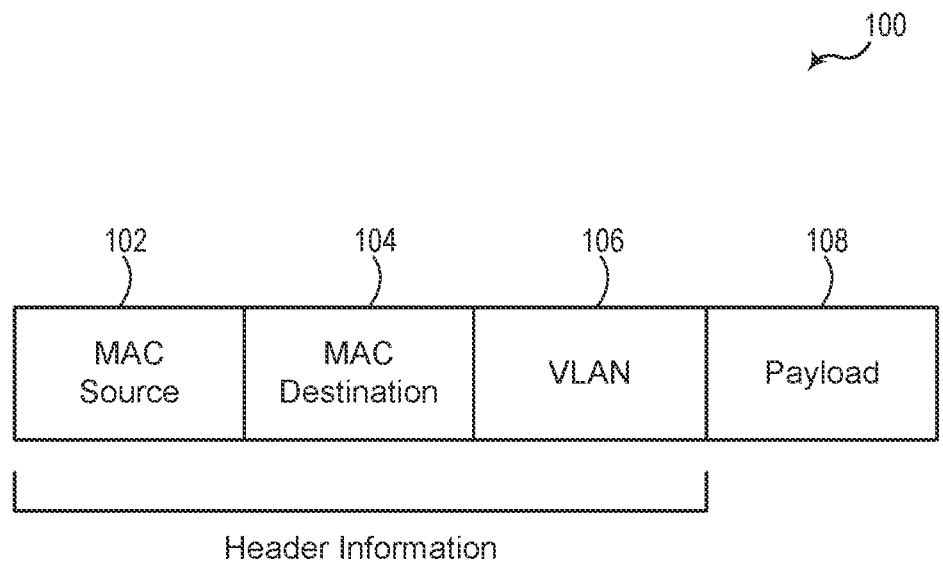
FIG. 2 is a diagram of a GOOSE frame communicated over the communication network of FIG. 1, in accordance with an embodiment.

FIG. 2 is a diagram of the format of a part of a GOOSE message frame 100, in accordance with an embodiment. The header information of the GOOSE message frame 100 may include a source media access control (MAC) address 102, a destination MAC address 104, a virtual LAN (VLAN) 106, and a payload 108. The VLAN may include a tag protocol identifier (TPID), tag control information (TCI), and Ethertype. Further, the TCI may include a canonical frame indicator (CFI) and an optional VLAN identifier (VID). The payload 108 may include various payload header fields, such as a GOOSE identifier (ID), tag, and length fields, as well as a dataset that includes power system data from the power system 20.

Figure 3:
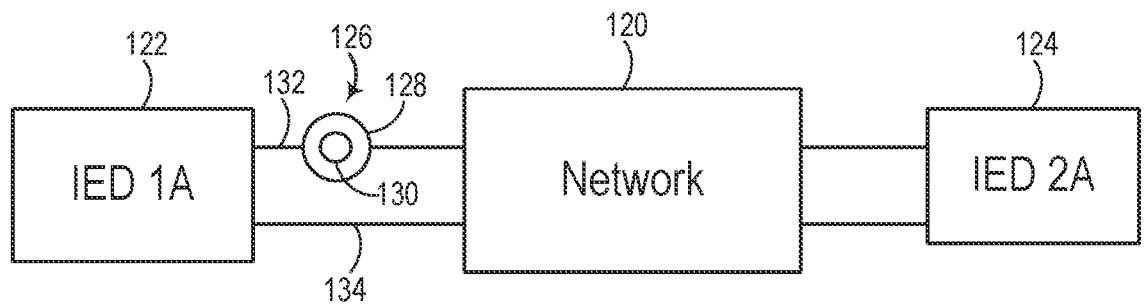
FIG. 3 is a network diagram of a GOOSE frame communicated over the communication network of FIG. 1, in accordance with an embodiment.

FIG. 3 is a network diagram of a local area network (LAN) 120 that connects an IED 122, such as IED 45 (feeder relay), to another IED 124, such as IED 44 (transformer relay). The IED 120 may publish GOOSE messages that contain power system data to one or more subscribing IEDs. For example, the IED 124 may subscribe to GOOSE messages that are published by the IED 122. As illustrated, the IED 122 communicates a GOOSE message 126 to the IED 124, via the LAN 120, that includes header information, which may have a destination, a source, and a virtual LAN (VLAN) 128. The GOOSE message 126 may include a dataset 130 that has power system data representative of characteristics of the power system 20. The IED 122 and the IED 124 may communicate the GOOSE message 126 via a primary communication path 132. If the primary communication path 132 no longer successfully communicates GOOSE messages, a secondary, or standby communication path 134 may be used to facilitate communication of GOOSE messages. However, if the publishing IED 122 and receiving IED 124 use a message duplication or replication method (such as IEC 62439-3 parallel redundancy protocol (PRP)) which considers GOOSE subscription at IED 124 from IED 122 successful if it receives a GOOSE message on either path 132 or path 134, then such communication may not indicate that the primary communication path is not communicating. In fact, IEC 62439-3 inhibits best known methods to measure and improve key process indicators since PRP reception monitoring of GOOSE indicates success even in the presence of failure of one of the duplicate GOOSE transmissions. For example, the time duration between GOOSE receptions may be monitored by a timer that is reset when a GOOSE message is received. If the timer expires before the next message is received, the subscriber may detect failure and set an alarm. However, when using PRP, the receiver may apply a boolean logic or function to duplicate messages such that if either of the duplicate messages is received, the timer is reset and there is no detection if one of the duplicate messages did not arrive. This situation may remain true regardless of how long one of the duplicate PRP receptions remains failed. Without error detection it may not be known when the error began and therefore the mean time to detect (MTTD) is not knowable. In the case of a communications assisted protection system, loss of the duplicate message on the first failed message path is considered an IEC 61508 DU failure and the failure of the second message path is an IEC 61508 DD failure. And since other related metrics of repairable systems similarly may involve on detection of failure, mean time to acknowledge, mean time to respond, mean time to repair, mean time to recover, mean time to resolve, mean time between failures, and mean time to failure, may not be possible either. As mentioned earlier, if the receiver IED is modified to overcome the IEC 62439-3 PRP method of disguising that one of the duplicate message paths is failed and made capable of expecting a second duplicate message to be received (due to receiving the first GOOSE message) but is not received, the subscribing IED may create and send an alarm indicating that a message path is not communicating.

Figure 4:
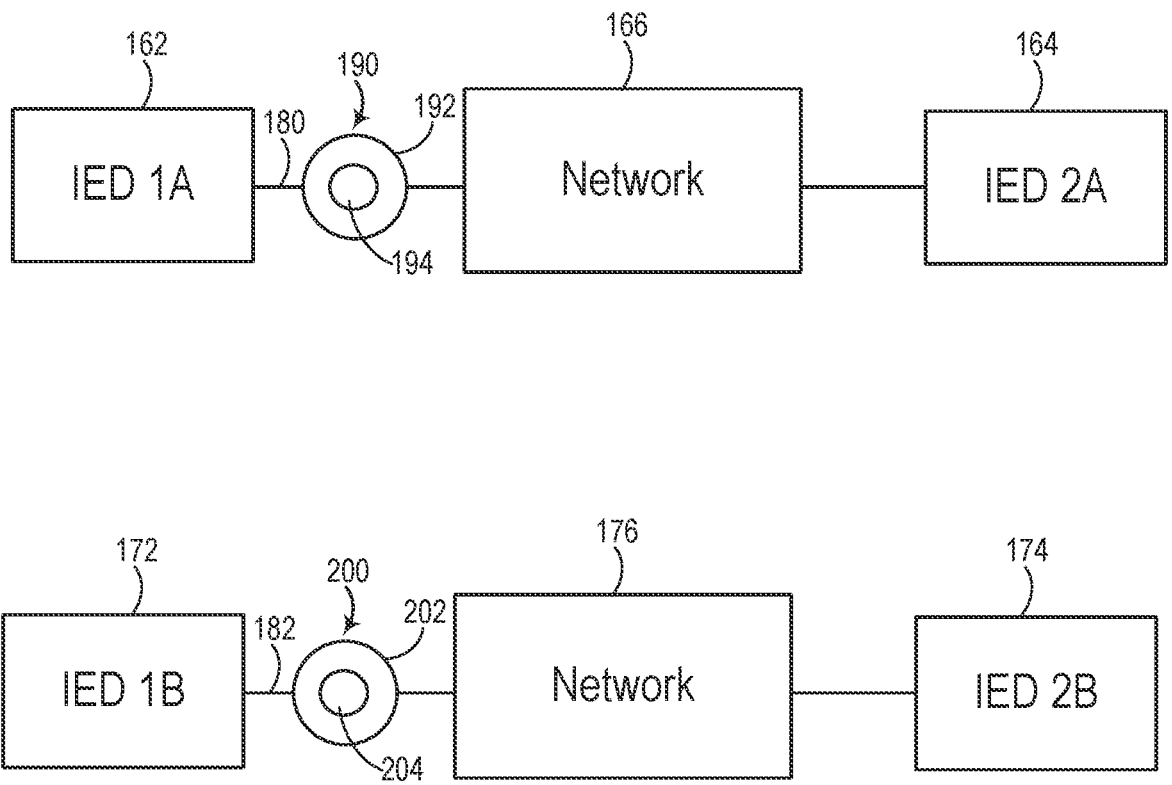
FIG. 4 is a network diagram of GOOSE messages communicated over the communication network of FIG. 1 with two physical networks, in accordance with an embodiment.

FIG. 4 is a network diagram of dual primary systems used to communicate GOOSE messages. In the illustrated embodiment, a first IED 162 is communicatively connected to a second IED 164 via a first LAN 166. Further, a third IED 172 is communicatively connected to a fourth IED 174 via a second LAN 176. The first LAN 166 and the second LAN 176 may be physically isolated. That is, the first IED 162, the second IED 164, and the first LAN 166 may represent a first primary protection system, such as IEDs 44-46 and switch 80 of FIG. 1, and the third IED 172, the fourth IED 174, and the second LAN 176 may represent a second primary protection system, such as that represented by IEDs 90-92 and switch 93 of FIG. 1.

The dual primary systems may provide similar or equal protection to each other. Further, the third IED 172 may communicate similar or equal data to the fourth IED 174 as the data communicated from the first IED 162 to the second IED 164.

While FIG. 3 illustrates that a secondary communication path may be used to improve reliability of communication to the receiving device, the receiving device may not be able to determine whether the primary communication path is not communicating. Further, while FIG. 4 provides additional reliability in communicating power system data by having a redundant system, a particular receiving IED may not be able to continue to receive data when the communication path is not communicating. Reliability of these dual primary systems may be further improved by adding additional communication connections to each IED 162, 164, 172, and 174 as well as more network connections in LANs 166 and 176. In some power systems, dual primary protection may be more costly or complex to be installed.

As explained below, IEDs may communicate using redundant GOOSE messages. Redundant may refer to 2, 3, or more GOOSE messages that communicate the same dataset with different header information (e.g., different VLAN identifiers) or GOOSE messages with dataset fields that may be linked to each other to provide similar power system information for processing by the protection logic. As used herein, the numbering of GOOSE messages may refer to the number of different GOOSE messages (e.g., with different headers) and may be communicated in any suitable ordering. When an IED publishes uniquely identifiable redundant messages, the receiving IED may distinguish when either GOOSE did not arrive and can detect and alarm this failure condition. Alternately, the receiver can be enhanced with tactics not documented within the IEC 62439 standard to distinguish when a PRP duplicate GOOSE did not arrive and can detect and alarm this failure condition.

Figure 5:
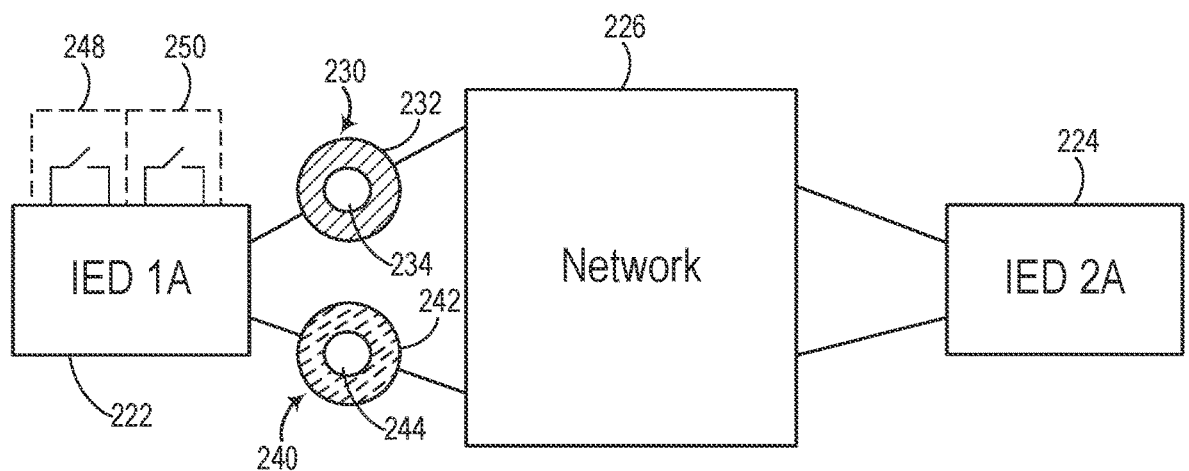
FIG. 5 is a network diagram of redundant GOOSE messages communicated over the communication network of FIG. 1 separated by virtual local area networks (VLANs), in accordance with an embodiment.

FIG. 5 is a network diagram of a network 226 that uses VLANs to communicate redundant GOOSE messages over the same physical network. An IED 222, such as a feeder relay (e.g., IED 45), may communicate GOOSE messages to another IED 224, such as a transformer relay (e.g., IED 44). Further, the IED 222 may communicate multiple GOOSE messages having the same dataset over the same LAN 226 to the IED 224.

The publishing IED 222 may communicate a first GOOSE message 230 to the subscribing IED 224. The first GOOSE message 230 includes first header information 232 and a dataset 234 that includes power system data. The publishing IED 222 may communicate a second GOOSE message 240 to the subscribing IED 224. The second GOOSE message 240 includes second header information 242 and a dataset 244 with the same power system data as contained in the dataset 234 of the first GOOSE message 230. That is, the first GOOSE message 230 and the second GOOSE message 240 may be redundant in which the datasets 234 and 244 include the same power system data. Further, the header information 232 of the first GOOSE message 230 may be different from the header information 242 of the second GOOSE message 240. For instance, the header information 232 may have a different VLAN (e.g., different VID) from the VLAN (e.g., different VID) of the header information 242.

Each of the first GOOSE message 230 and the second GOOSE message 240 may follow the same physical communication path (through LAN 226). As illustrated, different VLANs 232 and 242 may cause the first GOOSE message 230 and the second GOOSE message 240 to be treated as if the messages were sent on separate physical networks due to the different VLAN numbers 232 and 242 in each of the GOOSE messages while being sent over the same physical LAN 226. In some embodiments, the power system data in the first dataset 234 may be copied by the publishing IED 222 and included in the second dataset 244. In addition to having the same data elements, some embodiments may include the same dataset definition (e.g., GOOSE tag, GOOSE length, GOOSE ID, GOOSE simulation bit, GOOSE dataset entries, GOOSE test attributes, etc.) that are within the payload 148.

In another embodiment, the IED 222 may communicate the first GOOSE message 230 over a first physical port of the IED 222 and communicate the second GOOSE message 240 over a second physical port of the IED 222. That is, separate ethernet connections may be connected to the same network 226 to route the separate GOOSE messages. Alternatively, the messages may be routed over different communication paths across the network from the same port.

In another embodiment, the IED 222 may observe sensor measurements of the same physical hardware or separate hardware that is wired redundantly for each of the redundant messages. For example, the IED 222 may determine a first CB status of a CB (e.g., CB 72 in FIG. 1) based on a first set of input signals (e.g., via first detection hardware 248) from the power system. The IED 222 may then determine a second instantiation of circuit breaker status of the same circuit breaker (e.g., CB 72 in FIG. 1) based on a second set of input signals (e.g., via second detection hardware 250) via a second group of input signals separate from the first input signals. The IED 222 may then input the first circuit breaker status (e.g., CB 72 in FIG. 1) and the second circuit breaker status (e.g., CB 72 in FIG. 1) into a first GOOSE message and a second GOOSE message respectively, which may represent the same power system data. In such embodiments, the contents in the dataset definition of the second GOOSE message may be linked to the same field as in the first GOOSE message, thereby creating a redundant dataset of the same data.

In each of these embodiments, the IED 222 may communicate redundant GOOSE messages with different header information, such as differing VLANs 232 and 242, to allow the receiving device to determine whether each of the GOOSE messages was received. While VLANs are illustrated in the examples described herein, the different header information may include different source MAC addresses, different destination MAC addresses, different VLANs, or any combination thereof.

As illustrated, the subscribing IED 224 may receive the first GOOSE message 230 over a first GOOSE connection and may receive the second GOOSE message 240 over a second GOOSE connection. The subscribing IED 224 may then determine that the GOOSE messages represent the same data. In some embodiments, the subscribing IED 224 may compare the power system data itself of each of the GOOSE messages to confirm that the data has the same or similar power system values. In examples that use separate hardware or redundant measurements, differences in measurements (e.g., voltage measurements, current measurements, etc.), may be compared to thresholds to determine that the data represents the same power system values. In other embodiments, the IEDs 222 and 224 may share the association between the VLANs and/or other data to determine that the GOOSE messages represent the same data. For instance, the IED 224 may receive that the GOOSE messages with header information including VLANs 232 and 242 are associated with each other. Further, the IED 224 may determine independently that each GOOSE message was received within a time frame associated with the previous GOOSE message of the same configuration or based on time stamps of the messages, based on GOOSE IDs of the messages, and based on the associated header information including VLANs 232 and 242 to determine that the GOOSE messages 230 and 240 represent the same data.

The subscribing IED 224 may receive a first GOOSE message on the first GOOSE connection (i.e., a first configured GOOSE message) and a second GOOSE message on a second GOOSE connection (i.e., a second configured GOOSE message). The IED 224 may receive a third GOOSE message via the first GOOSE connection (i.e., a subsequent GOOSE message on the first GOOSE connection with a different (e.g., consecutive) sequence number from the first GOOSE message on the first GOOSE connection). The subscribing IED 224 may wait to receive a fourth GOOSE message via the second GOOSE connection (i.e., the subsequent GOOSE message with a different (e.g., consecutive) sequence number from the second GOOSE message on the second GOOSE connection). That is, the subscribing IED 224 may set a timer to expect to receive a fourth GOOSE within a preset timeframe upon receipt of the second GOOSE message to allow the subscribing IED 224 to detect that the fourth GOOSE message was not received. By setting a timer and determining that an expected fourth GOOSE message with a consecutive sequence number in the header was not received, the subscribing IED may comply with an IEC 61850 method to determine whether each GOOSE message was received while being able to perform protection operations using power system data from the first GOOSE message and the third GOOSE message. In doing so, the device is using an IEC 61850 method to change a duplicate IEC 61508 DU failure to a DD failure which enables alarms, logic adaptation, and triggers repair.

The subscribing IED 224 may determine that an expected GOOSE message was not received within a predetermined period of time from the received GOOSE message 240. In some embodiments, the second GOOSE message 240 may be expected to have the same power system data or approximately equivalent power system data (e.g., from monitoring similarly placed hardware) as the power system data in the first GOOSE message 230. Upon determining that the expected GOOSE message was not received based on expiration of the timer that is set upon receiving the second GOOSE message 240, the subscribing IED 224 may create a local alarm, modify local communications assisted logic, and send a signal indicating to an operator to assess the communication network of the subscribing IED 224. Alternatively, if the expected GOOSE message on the second connection were received with different power system data than the power system data in the corresponding GOOSE message of the first connection (e.g., the third GOOSE message), the IED 224 may create a local alarm, modify local communications assisted logic, and alert an operator to inspect the hardware of the IED 224. Further, the IEDs 222 and 224 may continue to communicate via the remaining communication channel.

In addition to improving the robustness message delivery through the communication network, redundant GOOSE messages may be used to test the protection system while allowing for the IEDs to continue communicating protection information while on-line. Additionally and/or alternatively, redundant GOOSE messages may allow for the device providing test values and the device under test to perform protection logic and alternately actuate or avoid actuating the power system equipment as desired.

Figure 6:
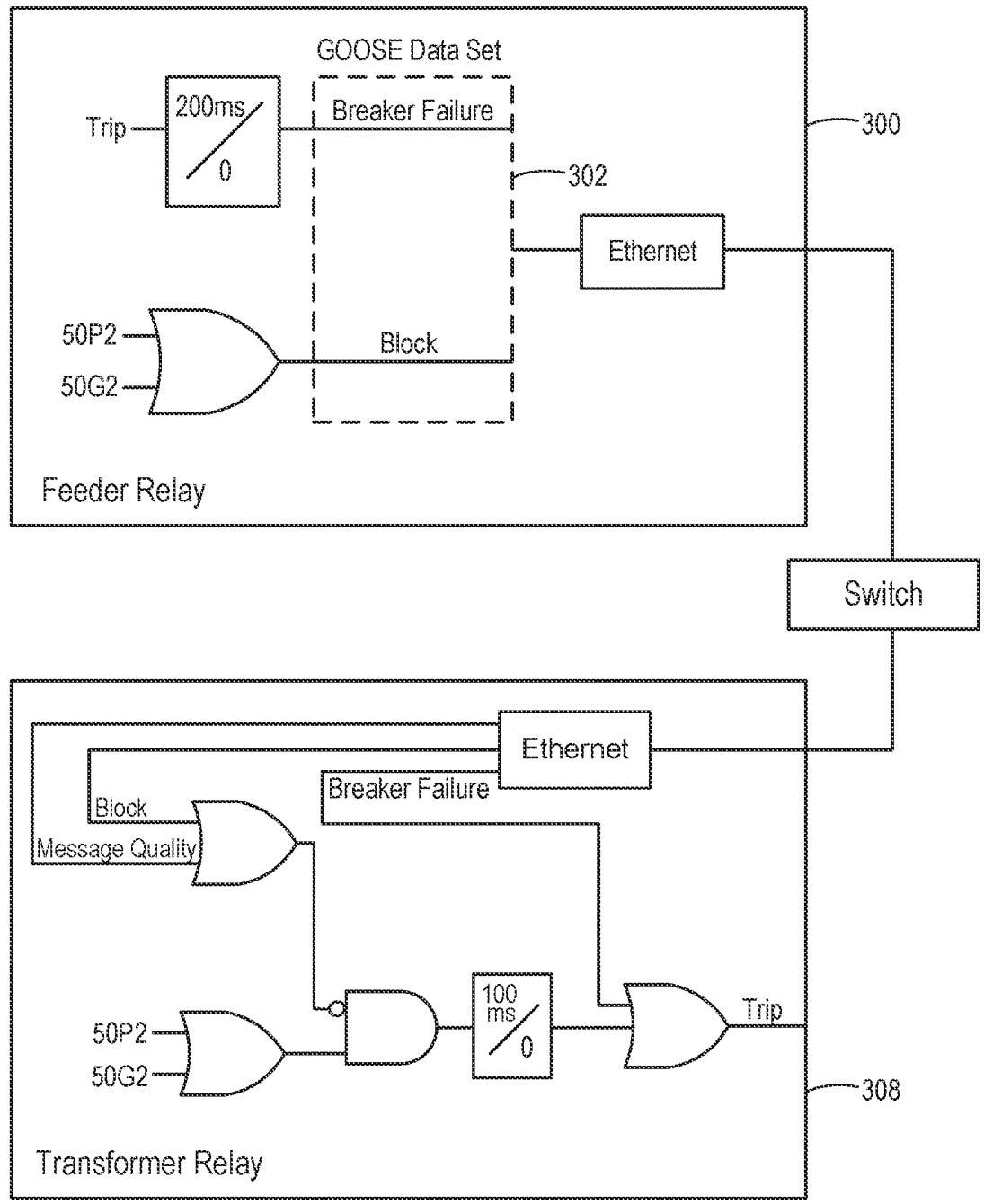
FIG. 6 is a logic diagram of protection logic performed across multiple IEDs of FIG. 1 that use GOOSE messages to communicate power system data for protection operations, in accordance with an embodiment.

FIG. 6 is a logic diagram of protection logic between a feeder relay, such as IED 45, and a transformer relay, such as IED 44. Some of the protection logic may be performed at the feeder relay, and some of the protection logic may be performed at the transformer relay, which may depend on the implementation and/or design choice. In the illustrated embodiment, the feeder relay may obtain an instantaneous phase overcurrent element (50P2) and an instantaneous ground overcurrent element (50G2) protection signals. The protection logic 300 of the feeder relay may determine whether to send a blocking signal to the transformer relay based on the 50P2 and 50G2 signals. Further, the protection logic 300 of the feeder relay may determine whether a breaker failure is present based on a delay in tripping (e.g., indicating that the circuit breaker is not tripping). The feeder relay may form a GOOSE message that include breaker failure data and blocking data in the dataset 302, and the GOOSE message may be sent to the transformer relay. The transformer relay may then perform the protection logic 308 to determine whether to trip the CB 70 of the transformer 32. The protection logic 308 may include obtaining 50P2 and 50G2 elements of the transformer 32 and the blocking data and breaker failure data from the GOOSE message sent by the feeder relay. While these are used as examples, any suitable protection elements/schemes may be included in the protection logic.

Figure 7:
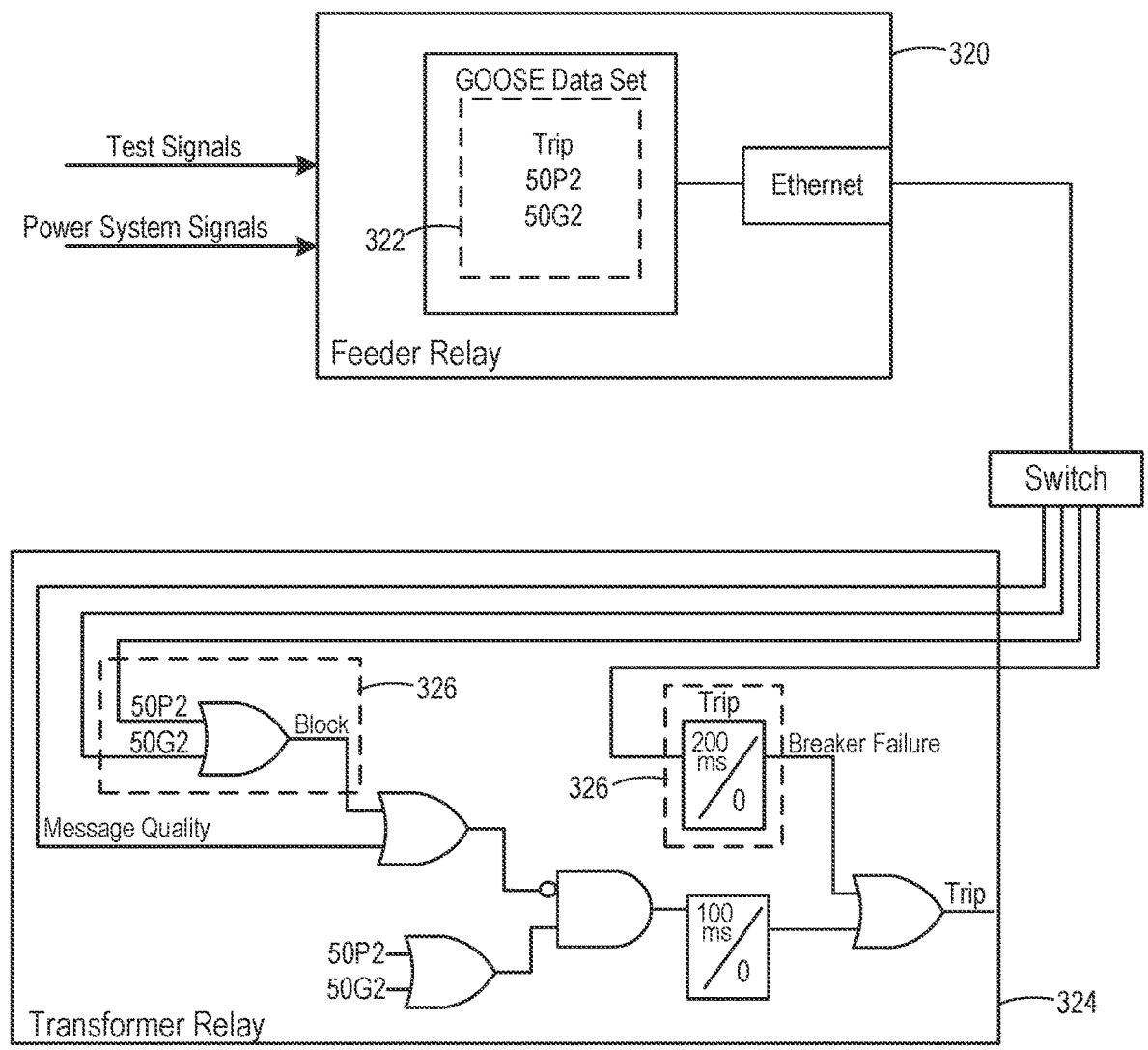
FIG. 7 is a logic diagram of an alternative protection logic performed across multiple IEDs of FIG. 1 using GOOSE messages, in accordance with an embodiment.

FIG. 7 is a logic diagram of alternative protection logic between the feeder relay and transformer relay with a different allocation of the protection logic that may be used to perform the same/similar protection operations to those described with respect to FIG. 6. As illustrated, the protection logic 320 of the feeder relay may be used to generate a GOOSE message with a dataset 322 that includes whether the transformer relay has tripped and the 50P2 and 50G2 protection elements. The GOOSE message may be sent to the transformer relay. That is, some of the protection logic 324 of the transformer relay was performed by the feeder relay in the embodiment shown in FIG. 6.

Because protection logic may be distributed between devices in different ways, an operator may inject test signals to interposing devices and the device under test (DUT) to provoke known signal outputs. A test may energize the trip circuit and actuate the controllable primary system field device, such as a CB, or a test may ensure that the trip circuit is not actuated in certain conditions. Some tests are staged such that the trip circuit is opened with an air gap so that the energization of the trip circuit may be measured but the CB is not actuated. Such tests may involve having redundancy in the power system to allow for portions of the power system to be isolated for test and offline in the power system. In other cases, if tests are performed on live systems without redundancy and the publishing devices are placed into test mode to communicate messages with contents that have the test mode attribute set, if a true fault were to occur, the protection system may not be configured to respond. Moreover, when a device is placed under test, the real-time local and interconnected logic between the devices may remain untested while portions of the code enacted while the IED is in test mode are tested. Accordingly, allowing for redundant GOOSE messaging with both GOOSE messages for test data and GOOSE messages for actual data simultaneously may be desirable.

Figure 8:
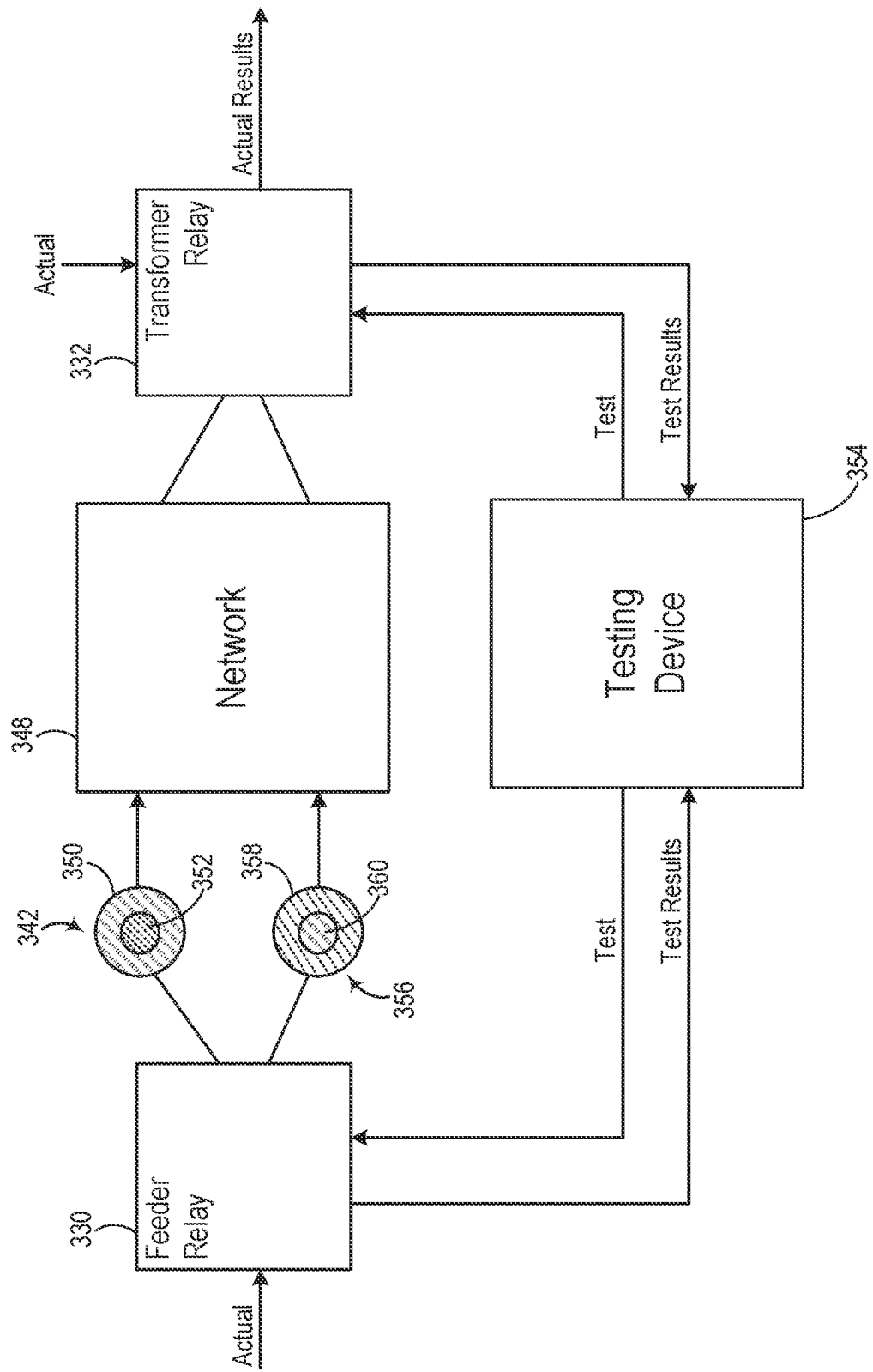
FIG. 8 is a network diagram of redundant GOOSE messages that are used to communicate live power system data as well as test power system data, in accordance with an embodiment.

FIG. 8 is a network diagram of an embodiment of a communication network 348 that communicates redundant GOOSE messages that include both test GOOSE messages and live GOOSE messages over the network. In this context, redundant GOOSE messages may refer to the fact that the power system data is of the same or similar datasets in both the test GOOSE message and the live GOOSE message. For example, a feeder relay 330, such as IED 45, may communicate GOOSE messages that include 50P2 and 50G2 signals based on live power system data and 50P2 and 50G2 signals based on test power system data. The test GOOSE message 342 may include first header information indicating that the GOOSE message is in fact simulation or test data. The test GOOSE message 342 may further or separately include a dataset that is test power system data as indicated by test attributes associated with message payload contents.

The feeder relay 330 may obtain test voltage and/or current measurements. In some embodiments, the test voltage measurements and test current measurements may be sent to the feeder relay 330 via a testing device 354. In other embodiments, an operator may input the test measurements into the feeder relay 330. The feeder relay 330 may then perform the protection logic, located at the feeder relay 330, using the test voltage measurements and/or current measurements in place of the actual power system data. The feeder relay 330 may communicate a test GOOSE message 342 to the transformer relay 332 using the LAN 348 to allow the transformer relay 332 to perform the protection logic using the test power system data.

The feeder relay 330 may also continue to send live GOOSE messages that represent actual (e.g., on-line) power system information obtained from the power system. For example, the feeder relay 330 may obtain voltage measurements and/or current measurements. The feeder relay 330 may then perform the same protection logic, located at the feeder relay 330, using the live voltage measurements and/or current measurements obtained from the power system 20. The feeder relay 330 may then generate a live GOOSE message 356 that includes second header information 358 indicating that the GOOSE message includes live information from the power system 20. The live GOOSE message 356 includes a dataset that has live power system data from the actual power system 20. The feeder relay 330 may then communicate the live GOOSE message 356 to the using the LAN 348 to allow transformer relay 332 to perform the protection logic using the live power system data. The test power system data and the actual power system data may provide the same or similar inputs to the protection logic of the feeder relay 330. For example, the test current measurements may be representative of current measurements obtained in the test. As such, the IED may provide a dataset of live power system data obtained when using actual measurements from sensors as inputs to the protection logic and provide a dataset of test power system data obtained when using test measurements representative of measurements from the sensors as inputs to the same protection logic.

The feeder relay 330 may also continue to send live GOOSE messages that represent actual (e.g., on-line) power system information obtained from the power system, perform local protection based on these live values and simultaneously send GOOSE messages with simulation bit set and/or test attributes set on dataset contents. For example, the feeder relay 330 may obtain circuit breaker status and voltage measurements and/or current measurements. The feeder relay 330 may then perform the same protection logic, located at the feeder relay 330, using the live circuit breaker status and voltage measurements and/or current measurements obtained from the power system 20. The feeder relay 330 may then generate a live GOOSE message 356 that includes second header information 358 indicating that the GOOSE message includes live information from the power system 20. The live GOOSE message 356 includes a dataset that has live power system data from the actual power system 20. The feeder relay 330 may then communicate the live GOOSE message 356 to the using the LAN 348 to allow transformer relay 332 to perform the protection logic using the live power system data. The test power system data and the actual power system data may provide the same or similar inputs to the protection logic of the feeder relay 330. For example, the test current measurements may be representative of current measurements obtained in the test or a simulated circuit breaker status. As such, the IED may provide a dataset of live power system data obtained when using actual measurements from sensors as inputs to the protection logic and provide a dataset of test power system data obtained when using test measurements representative of measurements from the sensors as inputs to the same protection logic. In this way, the IED 330 is aware of the true power system values including the CB status and continues to protect the feeder while also sending GOOSE messages with real power system values and GOOSE messages with test values for use in real and test communications assisted logic in the receiving IEDs. Further, the logic receiving IEDs can selectively act on live or simulated values such as a simulated feeder circuit breaker open position without the need to open the circuit breaker or adversely affect the protection of the feeder by forcing the feeder protection IED into test mode.

The feeder relay 330 may perform different communication logic to generate the live GOOSE message than the test GOOSE message. For example, the feeder relay 330 may insert a first VLAN identifier into a frame of the live power system data and insert a second VLAN identifier into a frame of the test power system data to indicate that the test GOOSE message includes test data.

In certain embodiments, the transformer relay 332 may use the VLAN 106 to identify whether a received GOOSE message is a test GOOSE message with test data or a live GOOSE message with live power system data. Alternatively and/or additionally, in a system with redundant GOOSE messaging as described with respect to FIGS. 4 and 5, one of the publications may be switched to test mode (e.g., with a simulation bit of the GOOSE message on or test attributes of dataset contents set on).

The transformer relay 332 may then receive the test GOOSE message and perform the protection logic located at the transformer relay 332 using the test power system data sent by the feeder relay 330. The transformer relay 332 may also receive the live GOOSE message and perform the same protection logic using the live power system data sent by the transformer relay 332. The test GOOSE message and the live GOOSE message may include the same fields in each dataset and may be derived from the testing device or the actual power system, respectively. Thus, the transformer relay 332 may perform the same protection logic using both datasets of the live GOOSE message and the test GOOSE message as inputs into the protection logic. By performing the same protection logic on both the live GOOSE messages and the test GOOSE messages, the operator may assess whether the protection logic across both the feeder relay 330 and the transformer relay 332 is operating correctly. Further, by communicating redundant GOOSE messages that include both test GOOSE messages and live GOOSE messages, the feeder relay 330 and the transformer relay 332 may continue to protect the power system 20 during a test.

In some embodiments, test data, such as simulated circuit breaker status, may be sent to the transformer relay 332 via the feeder relay IED 330. As an example, the test data representing the simulation of the circuit breaker position changing from closed to open may be used to allow the transformer relay 332 to determine that the circuit breaker has opened and to develop and act on a protection system response to a simulated power system state which can then be tested. Further, this allows for the feeder relay 330 to stay on line, aware of the true circuit breaker position, and to develop and act on a protection system response to a real events and changes to the power system state.

In some embodiments, additional test data may be sent to the transformer relay 332 via the testing device 354, such as test voltage measurements and/or test current measurements, similar to those sent to the feeder relay 330. As an example, the additional test data may be used to allow the transformer relay 332 to determine simulated 50P2 and 50G2 protection elements of FIG. 7. By using test power system data at both the feeder relay 330 and the transformer relay 332, a protection system response to a simulated power system state may be tested.

Figure 9:
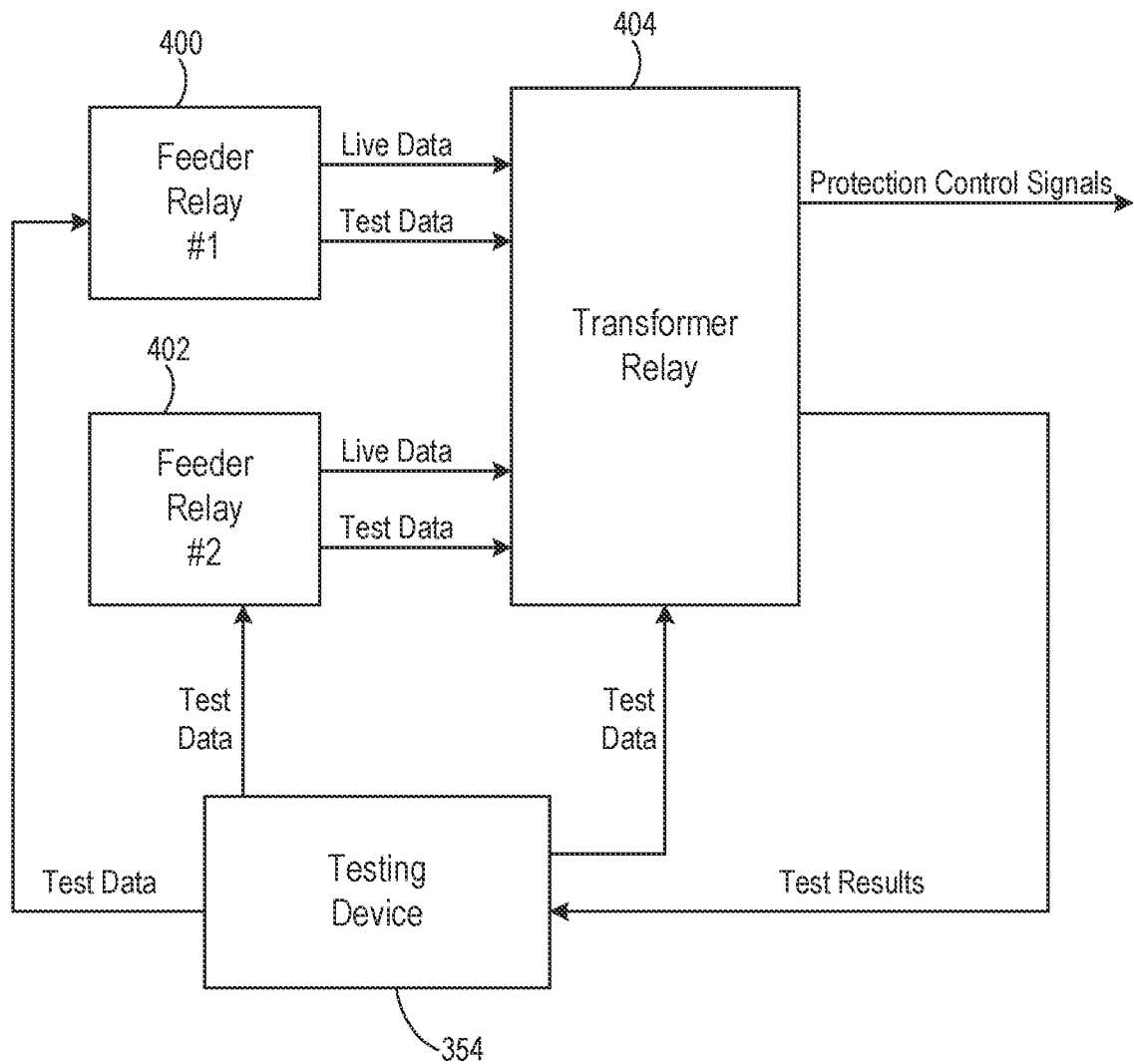
FIG. 9 is a block diagram of a testing device that uses redundant GOOSE messaging to simulate a power system scenario across multiple devices in a power system, in accordance with an embodiment.

FIG. 9 is a block diagram of the testing device 354 that uses redundant GOOSE messaging to simulate a power system scenario across multiple devices in a power system. The testing device of FIGS. 8 and 9 may be connected to the communication network (e.g., via switch 80) to allow the testing device to communicate with the IEDs in the power system. The feeder relays 400 and 402 may be embodiments of the IEDs 45 and 46 of FIG. 1, and the transformer relay 404 may be an embodiment of the IED 44 of FIG. 1. The testing device 354 may communicate test data to each of the feeder relays 400 and 402 and the transformer relay 404 to simulate a particular state of the power system and to apply the protection logic across each of the devices to perform the test scenario. In some embodiments, the testing device 354 may receive test GOOSE messages from each of the feeder relays 400 and 402 and the transformer relay 404.

The testing device 354 of FIGS. 8 and 9 may include similar components (e.g., processor 81, memory 82, display 84, and communication ports 83) to those described with respect to the IEDs 44 and 45 to allow the testing device 354 to perform any of the processes described above. One or more processors of the testing device 354 may execute instructions stored on the memory of the testing device to allow the testing device 354 to send testing data to the IEDs and receive test results from the IEDs. Further, the testing device 354 may allow an operator to display the test results to assess the operation of the power system 20. In some embodiments, the testing device 354 may be embodied as a central monitoring system. In other embodiments, the testing device 354 may be another IED on the power system 20.

The testing device 354 may send test voltage and/or current measurements to each of the feeder relays 400 and 402 and the transformer relay 404 to simulate a fault. The feeder relays 400 and 402 and the transformer relay 404 may each send test GOOSE messages to each other as if the simulated power system state were to occur on the actual power system. Further, the feeder relays 400 and 402 and the transformer relay 404 may send test result messages indicating CB status of the respective CBs to allow an operator to assess the results of the test. In the illustrated example, the transformer relay 404 may process, via the protection logic of the transformer relay 404, the test data in the test GOOSE messages from both the feeder relays 400 and 402 as well as other test data sent by the testing device 354.

In addition to the testing data, the feeder relays 400 and 402 and the transformer relay 404 may continue to send live GOOSE messages indicating the characteristics of the actual power system to each other independent of whether a test being performed. The transformer relay 404 may send protection control signals to a CB based on the characteristics of the actual power system as determined based on the live GOOSE messages. Further the transformer relay 404 may send test result GOOSE messages to the testing device 354 indicating the test status of the CB based on the results of the test data.

The transformer relay 404 may then output control signals to operate protective devices (e.g., CB 72) on the power system 20 based on the live power system data. The feeder relays 400 and 402 and the transformer relay 404 may process (e.g., via the local protection and communication assisted logic) the live and test data within a predetermined time of each other that allows for protection operations of the power system to continue during the test. In some embodiments, the feeder relays 400 and 402 and the transformer relay 404 may process the live power system data and test power system data sequentially (e.g., first-in first-out independent of the VLAN identifier).

Additionally, the transformer relay 404 may output test result signals to the testing device 354 or another device to allow an operator to assess the results of the test. For example, the test result may indicate whether the transformer relay 404 would trip if the test power system data were to occur on the power system 20. By using redundant GOOSE messaging, this testing process may be expanded to allow for simulated results across the power system to be performed without affecting actual protection operations during testing.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An intelligent electronic device (IED), comprising:
   a memory; and
   a processor operatively coupled to the memory, wherein the processor is configured to execute instructions stored on the memory to cause operations comprising:
   obtaining actual power system data of a power system;
   obtaining test data of the power system, wherein the test data and the actual power system data provide inputs to protection logic of the IED;
   during a test operation, publishing a first Generic Object Oriented Substation Event (GOOSE) message with a dataset based on the protection logic of the IED being applied to the actual power system data, and with a first virtual area network (VLAN) identifier indicating that the first GOOSE message includes a data set based on the protection logic being applied to the actual power system data;
   during the test operation, publishing a second GOOSE message with a dataset based on the protection logic of the IED being applied to the test data, and with a second VLAN identifier different from the first VLAN identifier indicating that the second GOOSE message includes a data set based on the protection logic being applied to the test data;
   during the test operation, the first GOOSE message and the second GOOSE message are redundant communications; and
   protecting the power system during the test operation.

2. The IED of claim 1, wherein the IED is configured to perform the same protection logic to process the actual power system data and the test data, and wherein the actual power system data and the test data include the same inputs to the protection logic.

3. The IED of claim 2, wherein the IED is configured to perform different communication logic to generate the first GOOSE message than the second GOOSE message.

4. The IED of claim 3, wherein the communication logic is configured to insert the first VLAN identifier into a frame of the actual power system data and insert a second VLAN identifier into a frame of the test power system data, different from the first VLAN.

5. The IED of claim 1, wherein the IED is configured to send a protection control signal to perform a protection operation on the power system based on the first GOOSE message.

6. A non-transitory, computer readable medium comprising instructions configured to be executed by a processor to cause the processor to:
   obtain, via an intelligent electronic device (IED), actual power system data of a power system;
   obtain test data of a test of the power system, wherein the test data and the actual power system data are used as inputs to protection logic of the IED;
   during a test operation, publish a first Generic Object Oriented Substation Event (GOOSE) message with a dataset based on the protection logic of the IED being applied to the actual power system data, and with a first virtual area network (VLAN) identifier indicating that the first GOOSE message includes a data set based on the protection logic being applied to the actual power system data;
   during the test operation, publish a second GOOSE message with a dataset based on the protection logic of the IED being applied to the test data, and with a second VLAN identifier different from the first VLAN identifier indicating that the second GOOSE message includes a data set based on the protection logic being applied to the test data;
   during the test operation, the first GOOSE message and the second GOOSE message are redundant communications; and
   protecting the power system during the test operation.

7. The non-transitory, computer-readable medium of claim 6, comprising instructions configured to be executed by the processor to cause the processor to perform the protection logic to process both the actual power system data and the test data within a predetermined period of time of each other that allows protection operations of the power system to continue during the test.

8. The non-transitory, computer-readable medium of claim 6, comprising instructions configured to be executed by the processor to cause the processor to, during the test, send a signal to a circuit breaker to trip the circuit breaker based on the actual power system data.

9. The non-transitory, computer-readable medium of claim 6, comprising instructions configured to be executed by the processor to cause the processor to perform the protection logic on both the actual power system data and the test data in a first-in first-out basis.

10. The non-transitory, computer-readable medium of claim 6, comprising instructions configured to be executed by the processor to cause the processor to receive the test data via a local area network (LAN) to initiate a test without an operator being present at the IED.

11. The non-transitory, computer-readable medium of claim 6, wherein the first GOOSE message and the second GOOSE message have datasets that include inputs into protection logic of a subscribing IED to allow the subscribing IED to process both datasets with the same protection logic, thereby allowing protection logic across both the publishing IED and the subscribing IED to be tested while maintaining protection operations with the actual power system data.

12. An intelligent electronic device (IED), comprising:
    a memory; and a processor operatively coupled to the memory, wherein the processor is configured to execute instructions stored on the memory to cause operations comprising:
obtaining actual power system data of a power system;
obtaining test data of the power system, wherein the test data and the actual power system data provide inputs to protection logic of the IED;
publishing a first Generic Object Oriented Substation Event (GOOSE) message that comprises:
a dataset based on the protection logic of the IED being applied to the actual power system data; and
a first virtual area network (VLAN) identifier indicating that the actual power system data is based on live measurements from the power system; and
publishing a second GOOSE message that comprises:
a dataset based on the protection logic of the IED being applied to the test data; and
a second VLAN identifier, different from the first VLAN identifier, indicating that the test data is based on the test data inputs to the IED.

13. The IED of claim 12, wherein the IED is configured to publish the first GOOSE message and the second GOOSE message as redundant communications.

14. The IED of claim 12, wherein the IED is configured to publish the first GOOSE message and the second GOOSE message during a test operation, and the IED is configured to continue protection of the power system during the test operation.

* * * * *